(12) United States Patent
Strelnikoff et al.

(10) Patent No.: US 12,106,779 B1
(45) Date of Patent: Oct. 1, 2024

(54) SYSTEM AND METHOD FOR SEMANTICALLY GROUNDED VIDEO GENERATION

(71) Applicant: HRL Laboratories, LLC, Malibu, CA (US)

(72) Inventors: Sasha Strelnikoff, Seattle, WA (US); Nicholas A. Ketz, Topanga, CA (US); Praveen K Pilly, West Hills, CA (US)

(73) Assignee: HRL LABORATORIES, LLC, Malibu, CA (US)

( * ) Notice: Subject to any disclaimer, the term of this patent is extended or adjusted under 35 U.S.C. 154(b) by 58 days.

(21) Appl. No.: 18/110,270

(22) Filed: Feb. 15, 2023

(51) Int. Cl.
*G11B 27/034* (2006.01)
*G06N 3/08* (2023.01)
*H04N 19/172* (2014.01)
*H04N 19/17* (2014.01)

(52) U.S. Cl.
CPC .......... *G11B 27/034* (2013.01); *G06N 3/08* (2013.01); *H04N 19/172* (2014.11)

(58) Field of Classification Search
USPC ........................................ 386/241
See application file for complete search history.

(56) References Cited

U.S. PATENT DOCUMENTS 11,740,372 B1 * 8/2023 Tian ................ G01V 1/282 702/14
11,816,179 B2 * 11/2023 Nookala ............... G06N 3/047

OTHER PUBLICATIONS

Clark, A., Donahue, J., & Simonyan, K. (2019). Adversarial video generation on complex datasets. arXiv preprint arXiv:1907.06571, pp. 1-21.
Wu, C., Liang, J., Ji, L., Yang, F., Fang, Y., Jiang, D., & Duan, N. (2021). Nüwa: Visual Synthesis Pre-training for Neural visUal World creAtion. arXiv preprint arXiv:2111.124 17, pp. 1-28.
Kingma, D.P. and Welling, M., 2013. Auto-encoding variational Bayes. arXiv preprint arXiv:1312.6114, pp. 1-14.
Ha, D. and Schmidhuber, J., 2018. Recurrent world models facilitate policy evolution. arXiv preprint arXiv:1809.01999, pp. 1-15.

(Continued)

*Primary Examiner* — Nigar Chowdhury
(74) *Attorney, Agent, or Firm* — TOPE-MCKAY & ASSOCIATES

(57) ABSTRACT

Described is a system for semantically grounded video generation. In operation, the system receives a raw video frame of a scene from one or more sensors on an autonomous platform and then encodes the video into a low-dimensional representation of the scene. The low-dimensional representation is then decoded and fed into a controller model for the autonomous platform. Semantic concepts are extracted and then fed into a world model to predict state and action dynamics of the autonomous platform. A raw observation space is then fed into discriminator networks that operate on frames and videos to determine between real and synthetically generated content. The generative capability of one or more encoders and decoders are modified such that the discriminator networks are unable to distinguish between real and synthetically generated content. Finally, the system recursively generates semantically grounded videos using a conjunction of the world model and controller model.

21 Claims, 5 Drawing Sheets

(56) References Cited

OTHER PUBLICATIONS

Ketz, N., Kolouri, S. and Pilly, P., 2019. Continual Learning Using World Models for Pseudo-Rehearsal. arXiv preprint arXiv:1903.02647, pp. 1-16.

Schulman, J., Wolski, F., Dhariwal, P., Radford, A. and Klimov, O., 2017. Proximal policy optimization algorithms. arXiv preprint arXiv:1707.06347, p. 1-12.

Goodfellow, I., Pouget-Abadie, J., Mirza, M., Xu, B., Warde-Farley, D., Ozair, S., Courville, A. and Bengio, Y., 2014. Generative adversarial nets. Advances in Neural Information Processing Systems, 27, pp. 1-9.

Ronneberger, O., Fischer, P. and Brox, T., Oct. 2015, U-net : Convolutional networks for biomedical image segmentation. In International Conference on Medical image computing and computer-assisted intervention, pp. 234-241, Springer, Cham.

Park, T., Liu, M.Y., Wang, T.C. and Zhu, J.Y., 2019. Semantic image synthesis with spatially-adaptive normalization. In Proceedings of the IEEE/CVF Conference on Computer Vision and Pattern Recognition, pp. 2337-2346.

Unterthiner, T., van Steenkiste, S., Kurach, K., Marinier, R., Michalski, M. and Gelly, S., 2019. FVD: A new metric for video generation, pp. 1-9.

Alexey Dosovitskiy, A., German Ros, G., Codevilla, F., Lopez, A., Koltun, V., "Carla: An Open Urban Driving Simulator," Proceedings of the 1st Annual Conference on Robot Learning, pp. 1-16, 2017.

* cited by examiner

SYSTEM AND METHOD FOR SEMANTICALLY GROUNDED VIDEO GENERATION

BACKGROUND OF INVENTION

(1) Field of Invention

The present invention relates to a video generation system and, more specifically, to system for generating semantically grounded and meaningful videos.

(2) Description of Related Art

Enhanced video generation can be used by a variety of systems to modify raw image data with additional embeddings. By way of example, a process for adversarial video generation on complex datasets was described by Clark et al. (see the List of Incorporated Literature References, Literature Reference No. 1). The work of Clark et al. follows a basic video-generative adversarial network (GAN) architecture in which a class embedding and normally-sampled noise are passed as input to a Convolutional Gated Recurrent Unit-based generator. Their work uses two discriminators: The first is an image-level discriminator, which takes in randomly sampled full-resolution frames from the input video, and the second is a video-level discriminator, which takes as input a spatially down-sampled version of the original video. Each of these discriminators provides an additional GAN-loss for the generator. While somewhat operable, their method is limited in a number of ways. For example, the process of Clark et al. does not allow for the generated image sequence to be conditioned on semantic information and the generation process tends to produce image sequences containing objects with temporally inconsistent boundaries and semantic information.

Another example includes the work of Wu et al., in which the authors describe NÜWA: Visual Synthesis Pre-training for Neural visUal World creAtion (see Literature Reference No. 2). Their model is built on top of two image-level Vector Quantized-Variational AutoEncoders (VQ-VAEs) with an additional GAN loss, termed VQ-GAN. Each VQ-GAN shares the same embedding space and is trained separately to reconstruct natural images and segmentation maps, respectively. In order to produce videos from segmentation maps, each frame of a video segmentation map is individually encoded and concatenated to form a temporal encoding of the map. Using a three-dimensional (3D) local attention, the associated token of each succeeding image pixel is predicted spatially and then temporally. Each frame of the produced embedding can finally be separated and passed to the image VQ-GAN decoder in order to form the corresponding frame of the generated video. In order to produce semantically constrained temporal content, their method requires a sequence of semantic segmentations (one for each frame) which restricts the diversity of generated content and requires much manual labor. As noted above, the prior art uses either explicit semantic segmentation information or implicit data distribution information, both of which have constraints.

Thus, a continuing need exists for a system that learns and extracts semantic concepts underlying the data to facilitate the generation of semantically grounded and meaningful videos.

SUMMARY OF INVENTION

The present disclosure provides a system for semantically grounded video generation. In one aspect, the system includes one or more processors and associated memory. The memory is a non-transitory computer-readable medium having executable instructions encoded thereon, such that upon execution of the instructions, the one or more processors perform several operations, including receiving a raw video frame of a scene from one or more sensors on an autonomous platform; encoding the raw video frame into a low-dimensional representation of the scene; decoding the low-dimensional representation into a raw observation space; decoding the low-dimensional representation into a corresponding semantic segmentation map for the scene; feeding the low-dimensional representation into a controller model for the autonomous platform; extracting semantic concepts in the low-dimensional representation space that are related to an action selection by the controller model; feeding the extracted semantic concepts into a world model to predict state and action dynamics of the autonomous platform; feeding the raw observation space into discriminator networks that operate on frames and videos to determine between real and synthetically generated content; modifying the generative capability of one or more encoders and decoders such that the discriminator networks are unable to distinguish between real and synthetically generated content; recursively generating semantically grounded videos using a conjunction of the world model and controller model.

In another aspect, the system further performs an operation of training one or more neural networks from real data, reward signals, and the generated semantically grounded videos.

Additionally, the discriminator network includes a frame discriminator and a video discriminator, the frame discriminator being operable for individual frames to subsequently facilitate the generation of realistic frames, and wherein the video discriminator is operable for sequences of frames to subsequently facilitate the generation of realistic videos.

In another aspect, in recursively generating semantically grounded videos, the controller model generates a predicted action of the autonomous platform while the world model predicts a next state in a latent space of the generated semantically grounded video in response to the predicted action and current state.

In yet another aspect, the system further performs operations of encoding a semantic segmentation map of a current frame to generate feature maps; decoding the feature maps to generate a corresponding decoded semantic segmentation map for the scene; and transforming the decoded semantic segmentation map to modulate generation of a raw video frame using modified layer-wise batch normalizations.

Additionally, the one or more encoders and decoders are modified using adversarial training methods until the discriminator networks are unable to distinguish between real and synthetically generated content.

Further, the semantically grounded videos are recursively generated using a conjunction of the world model and controller model by triggering a random input in any of the one or more sensors or by a random initialization in the low-dimensional representation or by a random initialization in the extracted concepts.

Finally, the present invention also includes a computer program product and a computer implemented method. The computer program product includes computer-readable instructions stored on a non-transitory computer-readable medium that are executable by a computer having one or more processors, such that upon execution of the instructions, the one or more processors perform the operations listed herein. Alternatively, the computer implemented method includes an act of causing a computer to execute such instructions and perform the resulting operations.

BRIEF DESCRIPTION OF THE DRAWINGS

The objects, features and advantages of the present invention will be apparent from the following detailed descriptions of the various aspects of the invention in conjunction with reference to the following drawings, where.

DETAILED DESCRIPTION

Figure 1:
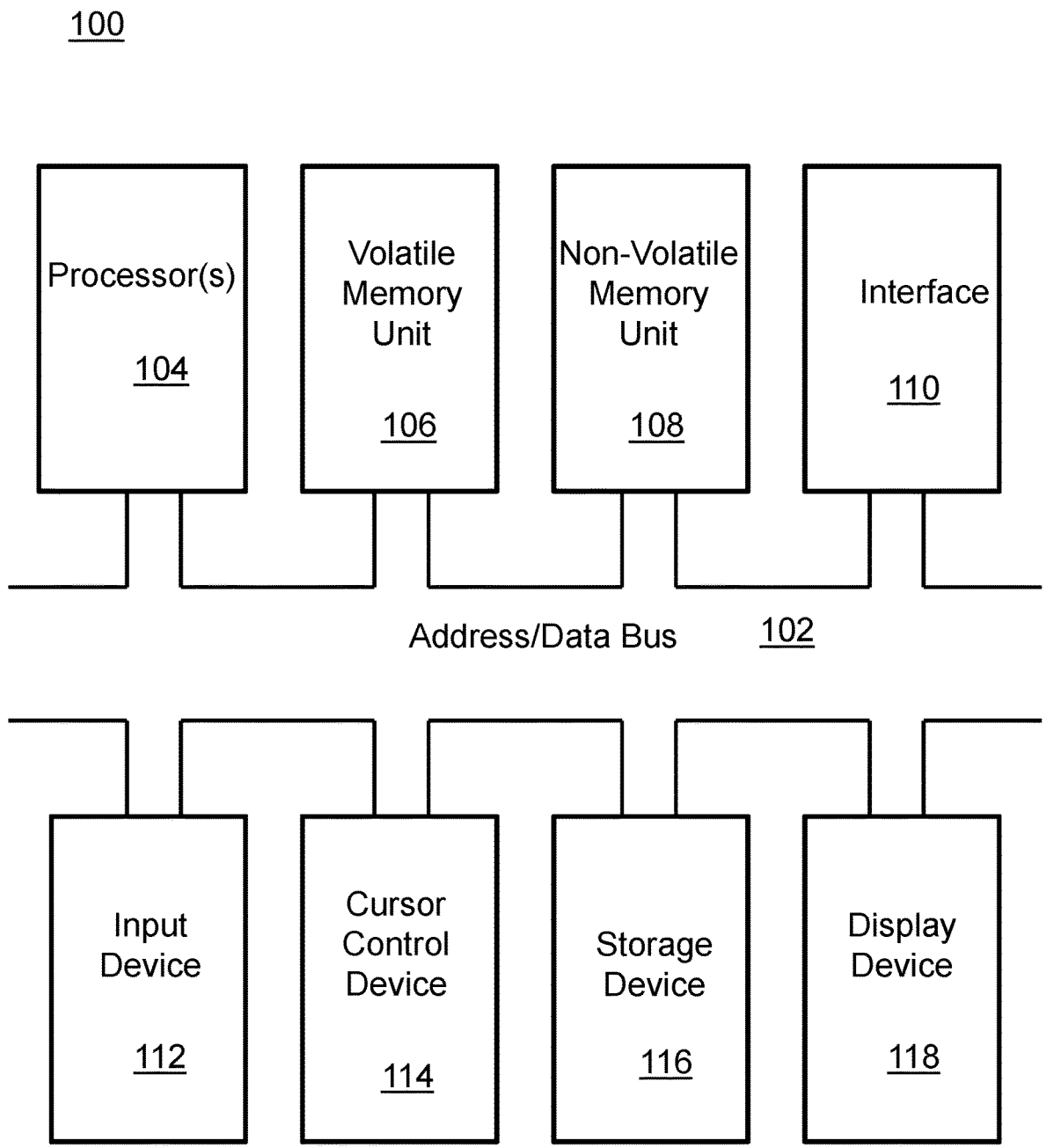
FIG. 1 is a block diagram depicting the components of a system according to various embodiments of the present invention.

The present invention relates to a video generation system and, more specifically, to system for generating semantically grounded and meaningful videos. The following description is presented to enable one of ordinary skill in the art to make and use the invention and to incorporate it in the context of particular applications. Various modifications, as well as a variety of uses in different applications, will be readily apparent to those skilled in the art, and the general principles defined herein may be applied to a wide range of aspects. Thus, the present invention is not intended to be limited to the aspects presented, but is to be accorded the widest scope consistent with the principles and novel features disclosed herein.

In the following detailed description, numerous specific details are set forth in order to provide a more thorough understanding of the present invention. However, it will be apparent to one skilled in the art that the present invention may be practiced without necessarily being limited to these specific details. In other instances, well-known structures and devices are shown in block diagram form, rather than in detail, in order to avoid obscuring the present invention.

The reader's attention is directed to all papers and documents which are filed concurrently with this specification and which are open to public inspection with this specification, and the contents of all such papers and documents are incorporated herein by reference. All the features disclosed in this specification (including any accompanying claims, abstract, and drawings) may be replaced by alternative features serving the same, equivalent or similar purpose, unless expressly stated otherwise. Thus, unless expressly stated otherwise, each feature disclosed is one example only of a generic series of equivalent or similar features.

Furthermore, any element in a claim that does not explicitly state "means for" performing a specified function, or "step for" performing a specific function, is not to be interpreted as a "means" or "step" clause as specified in 35 U.S.C. Section 112(f). In particular, the use of "step of" or "act of" in the claims herein is not intended to invoke the provisions of 35 U.S.C. 112(f).

Before describing the invention in detail, first a list of cited references is provided. Next, a description of the various principal aspects of the present invention is provided. Subsequently, an introduction provides the reader with a general understanding of the present invention. Finally, specific details of various embodiment of the present invention are provided to give an understanding of the specific aspects.

(1) LIST OF INCORPORATED LITERATURE REFERENCES

The following references are cited throughout this application. For clarity and convenience, the references are listed herein as a central resource for the reader. The following references are hereby incorporated by reference as though fully set forth herein. The references are cited in the application by referring to the corresponding literature reference number, as follows:

1. Clark, A., Donahue, J., & Simonyan, K. (2019). Adversarial video generation on complex datasets. arXiv preprint arXiv:1907.06571.
2. Wu, C., Liang, J., Ji, L., Yang, F., Fang, Y., Jiang, D., & Duan, N. (2021). NÜWA: Visual Synthesis Pre-training for Neural visUal World creAtion. arXiv preprint arXiv: 2111.12417.
3. Kingma, D. P. and Welling, M., 2013. Auto-encoding variational Bayes. arXiv preprint arXiv:1312.6114.
4. Ha, D. and Schmidhuber, J., 2018. Recurrent world models facilitate policy evolution. arXiv preprint arXiv: 1809.01999.
5. Ketz, N., Kolouri, S. and Pilly, P., 2019. Continual Learning Using World Models for Pseudo-Rehearsal. arXiv preprint arXiv:1903.02647.
6. Schulman, J., Wolski, F., Dhariwal, P., Radford, A. and Klimov, O., 2017. Proximal policy optimization algorithms. arXiv preprint arXiv:1707.06347.
7. Goodfellow, I., Pouget-Abadie, J., Mirza, M., Xu, B., Warde-Farley, D., Ozair, S., Courville, A. and Bengio, Y., 2014. Generative adversarial nets. *Advances in Neural Information Processing Systems*, 27.
8. Ronneberger, O., Fischer, P. and Brox, T., 2015, October. U-net: Convolutional networks for biomedical image segmentation. In *International Conference on Medical image computing and computer-assisted intervention* (pp. 234-241). Springer, Cham.
9. Park, T., Liu, M. Y., Wang, T. C. and Zhu, J. Y., 2019. Semantic image synthesis with spatially-adaptive normalization. In *Proceedings of the IEEE/CVF Conference on Computer Vision and Pattern Recognition* (pp. 2337-2346).
10. U.S. application Ser. No. 17/590,726, entitled, "System and Method for Improved Generalization From Concept Constrained Dreams".
11. U.S. application Ser. No. 17/901,703, entitled, "System and Method for Unsupervised Concept Extraction From Reinforcement Learning Agents".
12. Unterthiner, T., van Steenkiste, S., Kurach, K., Marinier, R., Michalski, M. and Gelly, S., 2019. FVD: A new metric for video generation.
13. Alexey Dosovitskiv, A., German Ros, G., Codevilla, F., Lopez, A., Koltun, V., "CARLA: An Open Urban Driving Simulator," Proceedings of the 1st Annual Conference on Robot Learning, pages 1-16, 2017.

(2) PRINCIPAL ASPECTS

Various embodiments of the invention include three "principal" aspects. The first is a system for semantically grounded video generation. The system is typically in the form of a computer system operating software or in the form of a "hard-coded" instruction set. This system may be incorporated into a wide variety of devices that provide different functionalities. The second principal aspect is a method, typically in the form of software, operated using a data processing system (computer). The third principal aspect is a computer program product. The computer program product generally represents computer-readable instructions stored on a non-transitory computer-readable medium such as an optical storage device, e.g., a compact disc (CD) or digital versatile disc (DVD), or a magnetic storage device such as a floppy disk or magnetic tape. Other, non-limiting examples of computer-readable media include hard disks, read-only memory (ROM), and flash-type memories. These aspects will be described in more detail below.

A block diagram depicting an example of a system (i.e., computer system 100) of the present invention is provided in FIG. 1. The computer system 100 is configured to perform calculations, processes, operations, and/or functions associated with a program or algorithm. In one aspect, certain processes and steps discussed herein are realized as a series of instructions (e.g., software program) that reside within computer readable memory units and are executed by one or more processors of the computer system 100. When executed, the instructions cause the computer system 100 to perform specific actions and exhibit specific behavior, such as described herein. In various aspects, the computer system 100 can be embodied in any device(s) that operates to perform the functions as described herein as applicable to the particular application, such as a desktop computer, a mobile or smart phone, a tablet computer, a computer embodied in a mobile platform, or any other device or devices that can individually and/or collectively execute the instructions to perform the related operations/processes.

The computer system 100 may include an address/data bus 102 that is configured to communicate information. Additionally, one or more data processing units, such as a processor 104 (or processors), are coupled with the address/data bus 102. The processor 104 is configured to process information and instructions. In an aspect, the processor 104 is a microprocessor. Alternatively, the processor 104 may be a different type of processor such as a parallel processor, application-specific integrated circuit (ASIC), programmable logic array (PLA), complex programmable logic device (CPLD), or a field programmable gate array (FPGA) or any other processing component operable for performing the relevant operations.

The computer system 100 is configured to utilize one or more data storage units. The computer system 100 may include a volatile memory unit 106 (e.g., random access memory ("RAM"), static RAM, dynamic RAM, etc.) coupled with the address/data bus 102, wherein a volatile memory unit 106 is configured to store information and instructions for the processor 104. The computer system 100 further may include a non-volatile memory unit 108 (e.g., read-only memory ("ROM"), programmable ROM ("PROM"), erasable programmable ROM ("EPROM"), electrically erasable programmable ROM "EEPROM"), flash memory, etc.) coupled with the address/data bus 102, wherein the non-volatile memory unit 108 is configured to store static information and instructions for the processor 104. Alternatively, the computer system 100 may execute instructions retrieved from an online data storage unit such as in "Cloud" computing. In an aspect, the computer system 100 also may include one or more interfaces, such as an interface 110, coupled with the address/data bus 102. The one or more interfaces are configured to enable the computer system 100 to interface with other electronic devices and computer systems. The communication interfaces implemented by the one or more interfaces may include wireline (e.g., serial cables, modems, network adaptors, etc.) and/or wireless (e.g., wireless modems, wireless network adaptors, etc.) communication technology. Further, one or more processors 104 (or devices, such as autonomous platforms) can be associated with one or more associated memories, where each associated memory is a non-transitory computer-readable medium. Each associated memory can be associated with a single processor 104 (or device), or a network of interacting processors 104 (or devices), such as a network of autonomous platforms (e.g., autonomous vehicles, robots).

In one aspect, the computer system 100 may include an input device 112 coupled with the address/data bus 102, wherein the input device 112 is configured to communicate information and command selections to the processor 104. In accordance with one aspect, the input device 112 is an alphanumeric input device, such as a keyboard, that may include alphanumeric and/or function keys. Alternatively, the input device 112 may be an input device other than an alphanumeric input device. In an aspect, the computer system 100 may include a cursor control device 114 coupled with the address/data bus 102, wherein the cursor control device 114 is configured to communicate user input information and/or command selections to the processor 104. In an aspect, the cursor control device 114 is implemented using a device such as a mouse, a track-ball, a track-pad, an optical tracking device, or a touch screen. The foregoing notwithstanding, in an aspect, the cursor control device 114 is directed and/or activated via input from the input device 112, such as in response to the use of special keys and key sequence commands associated with the input device 112. In an alternative aspect, the cursor control device 114 is configured to be directed or guided by voice commands.

In an aspect, the computer system 100 further may include one or more optional computer usable data storage devices, such as a storage device 116, coupled with the address/data bus 102. The storage device 116 is configured to store information and/or computer executable instructions. In one aspect, the storage device 116 is a storage device such as a magnetic or optical disk drive (e.g., hard disk drive ("HDD"), floppy diskette, compact disk read only memory ("CD-ROM"), digital versatile disk ("DVD")). Pursuant to one aspect, a display device 118 is coupled with the address/data bus 102, wherein the display device 118 is configured to display video and/or graphics. In an aspect, the display device 118 may include a cathode ray tube ("CRT"), liquid crystal display ("LCD"), field emission display ("FED"), plasma display, or any other display device suitable for displaying video and/or graphic images and alphanumeric characters recognizable to a user.

The computer system 100 presented herein is an example computing environment in accordance with an aspect. However, the non-limiting example of the computer system 100 is not strictly limited to being a computer system. For example, an aspect provides that the computer system 100 represents a type of data processing analysis that may be used in accordance with various aspects described herein. Moreover, other computing systems may also be implemented. Indeed, the spirit and scope of the present technology is not limited to any single data processing environment. Thus, in an aspect, one or more operations of various aspects of the present technology are controlled or implemented using computer-executable instructions, such as program modules, being executed by a computer. In one implementation, such program modules include routines, programs, objects, components and/or data structures that are configured to perform particular tasks or implement particular abstract data types. In addition, an aspect provides that one or more aspects of the present technology are implemented by utilizing one or more distributed computing environments, such as where tasks are performed by remote processing devices that are linked through a communications network, or such as where various program modules are located in both local and remote computer-storage media including memory-storage devices.

Figure 2:
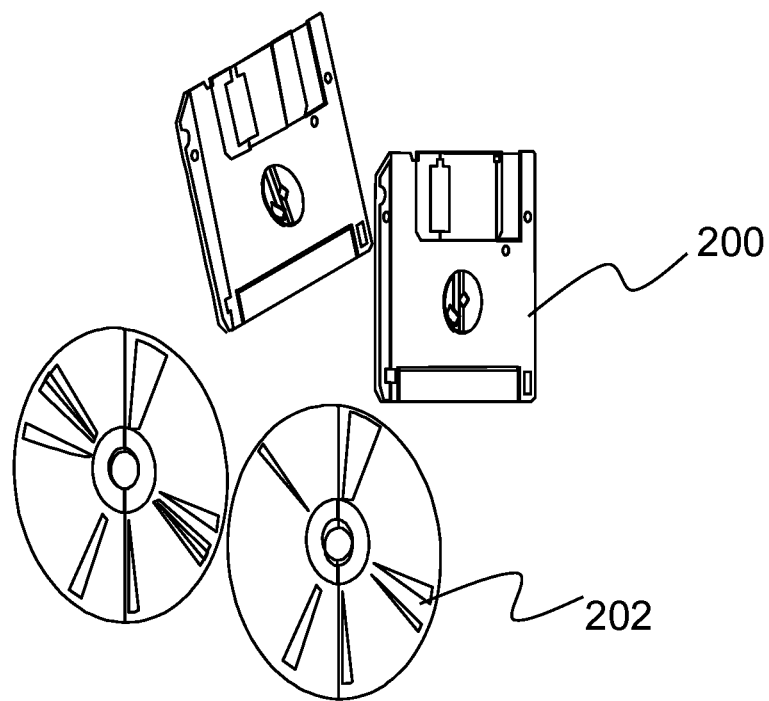
FIG. 2 is an illustration of a computer program product embodying an aspect of the present invention.

An illustrative diagram of a computer program product (i.e., storage device) embodying the present invention is depicted in FIG. 2. The computer program product is depicted as floppy disk 200 or an optical disk 202 such as a CD or DVD. However, as mentioned previously, the computer program product generally represents computer-readable instructions stored on any compatible non-transitory computer-readable medium. The term "instructions" as used with respect to this invention generally indicates a set of operations to be performed on a computer, and may represent pieces of a whole program or individual, separable, software modules. Non-limiting examples of "instruction" include computer program code (source or object code) and "hard-coded" electronics (i.e. computer operations coded into a computer chip). The "instruction" is stored on any non-transitory computer-readable medium, such as in the memory of a computer or on a floppy disk, a CD-ROM, and a flash drive. In either event, the instructions are encoded on a non-transitory computer-readable medium.

(3) INTRODUCTION

The present disclosure provides a system and method to automatically generate new videos that are semantically meaningful as judged by human evaluators. This system operates on sequential data obtained from one or more physical sensors, such as a camera, LIDAR, and/or RADAR. The system operates based on a unique combination of automatically learning semantic concepts and relations underlying the input real data, leveraging any human-annotated semantic segmentation information accompanying the data, and ensuring statistical consistency with the data at both frame and video levels.

Once trained, the system allows the generation of semantically meaningful videos seeded by a frame or a video snippet (either in raw pixels or with semantic information) or by a specified combination of concepts for a frame or across several frames. It has been shown that the system of the present disclosure outperforms previous methods that use either explicit semantic segmentation information or implicit data distribution information to constrain the video generative process to be as semantically grounded as possible, by additionally learning environment semantics to have a finer control on the video generative process.

While some prior art exists for video generation, existing techniques include a variety of weaknesses. For example and contrary to the teachings of Clark et al. (see Literature Reference No. 1) which does not allow for a generated image sequence to be conditioned on semantic information, the system of the present disclosure addresses such a defect by allowing for the generated content to be conditioned on input semantic segmentations as well as extracted semantic concepts. The system also utilizes and predicts semantic segmentations in addition to video, which allows it to maintain object semantic and boundary information across the frame sequence. Further and contrary to the teachings of the NÜWA model (see Literature Reference No. 2), the system of the present disclosure predicts the temporal evolution of the semantic segmentations, thereby eliminating the need for input semantic image sequences. In the NÜWA model, the semantic segmentation is embedded before the constrained video generation, which occasionally results in an alignment mismatch between the semantic segmentation and corresponding generated frame. The system of the present disclosure addresses this issue by supplying the semantic segmentation as a spatially-adaptive normalization of the video generator's layers, allowing the generator to utilize the semantic segmentation directly. Additionally, the present system further promotes alignment between the semantic segmentation and generated image by adding an additional GAN loss to the image generator, wherein the corresponding discriminator is trained to discern aligned segmentation-image pairs from misaligned pairs. Further, the present system also learns and extracts semantic concepts to have a much finer control on the video generative process.

As can be appreciated by those skilled in the art, an improved system for generating semantically meaningful videos has several applications. Some non-limiting examples of such applications include (1) filling-in missing content in videos (either within frames or extending through time), (2) compressing videos into extracted semantic concepts for low-bandwidth transmission and regenerating corresponding semantically grounded videos at the receiver, and (3) generating new video content for offline training of autonomous systems to achieve generalization to specified and unspecified corner cases that would be encountered during deployment. Further details regarding the system and method are provided below.

(4) SPECIFIC DETAILS OF VARIOUS EMBODIMENTS

Figure 3:
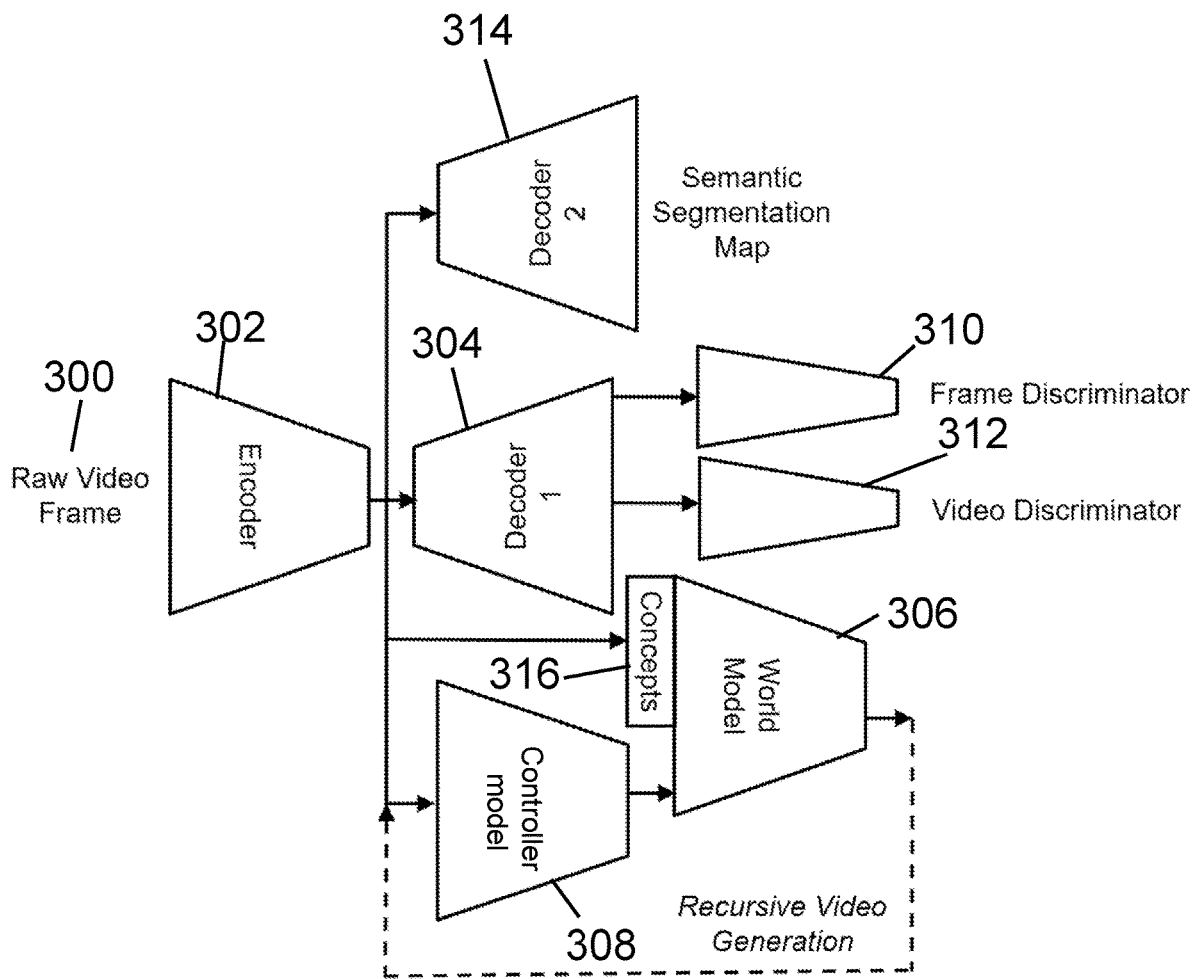
FIG. 3 is an illustration depicting system architecture according to various embodiments of the present invention.
Figure 4:
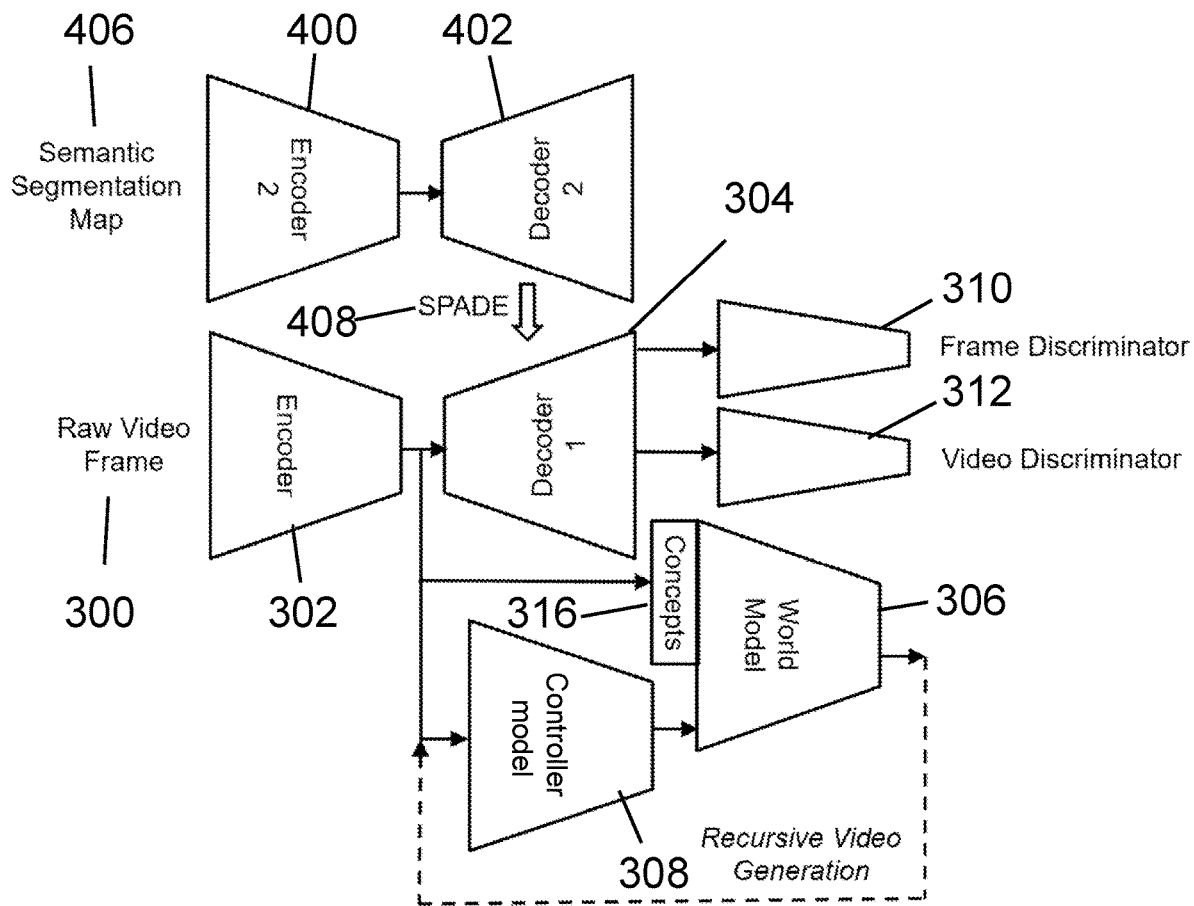
FIG. 4 is an illustration depicting system architecture according to various embodiments of the present invention.

As noted above, the present disclosure is directed to a system and method for generating semantically meaningful videos, two versions of which are depicted in FIGS. 3 and 4. The system operates on the data stream of a physical sensor or sensors to model the dynamics of the associated environment. If the sensor or sensors are mounted on an agent or autonomous system, then the world model takes the actions of the agent or autonomous system as an additional input. Although not limited thereto, for illustrative purposes, the following description describes the workings of the system with respect to sensors that provide camera-based inputs.

As shown in FIGS. 3 and 4, if the sensor or sensors provide high-dimensional inputs 300, the system uses an auto-encoding scheme (encoder 302) that is trained in an unsupervised manner to compute (or encode) a low-dimensional representation, which can be decoded (via a decoder 304) back to the raw observation space for each sensor. In other words, the input is a raw video frame (i.e., still image); given the encoding of the picture, the decoder 304 is meant to decode the encoding in order to produce the original input still image. For the case of multiple sensors, raw observations of sensors with low-dimensional inputs (if any) and the low-dimensional encoded representations of sensors with high-dimensional inputs are all concatenated. The dynamics of the environment are then learned in this latent space to predict the low-dimensional overall representation for the next time step in response to the low-dimensional representation for the current time step and the current action of the agent or autonomous system (if pertinent). One example by which the system can learn the latent space representation is the widely used Variational AutoEncoder (VAE) (see Literature Reference No. 3). Further, a non-limiting example by which the system can learn the dynamics in the latent space is the well-known world model 306 architecture proposed in Literature Reference Nos. 4 and 5. If there is an interactive agent or autonomous system, it is assumed that such a system includes a model that predicts the actions in response to the current state or observations (referred to as the controller model 308). One example of such a controller model 308 is the widely used policy gradient method to train reinforcement learning agents called Proximal Policy Optimization (PPO) (see Literature Reference No. 6).

This basic setup, once trained, can be used to generate new videos offline. It can triggered by a random inputs at any of the sensors or by a random initialization in the latent space. The action of the agent or autonomous system would be predicted by the controller model 308 and the world model 306 predicts the next state in the latent space of the generated video in response to the predicted action and the current state in the latent space. This process can be continued recursively for the desired length of the generated video, wherein the predicted next state is used to seed the generation for the next time step. For each frame of the generated video, Decoder 1 can be used to transform the latent space representation into the raw observation space of the sensors.

The system also adds adversarial discriminator networks (i.e., frame discriminator 310 and video discriminator 312) that operate on the outputs of a first decoder 304. The output of this decoder 304 (i.e., reconstruction of raw observation space) is passed to the frame discriminator 310 as well as stored in memory as the "next" frame in the video sequence. The corresponding sequence of frames is then passed to the video discriminator 312. In other words, the input to the frame discriminator 310 is the reconstructed raw image at each time instant, and the input to the video discriminator 312 is a sequence of reconstructed frames for a fixed number of time instants. The goal of the two discriminators 310 and 312 is to facilitate the generation of realistic frames and videos using generative adversarial methods, which are well known in the art (Literature Reference No. 7).

In particular, the frame discriminator 310 and video discriminator 312 are concurrently trained to be not able to differentiate between real and generated content at both frame- and video-levels. As noted above, this can be done by any of the several methods that are known to those skilled in the art. One example implementation is the original work on GANs, as described in Literature Reference No. 7. This modification would ensure the video generative process is constrained by the implicit data distribution information.

Next, the system leverages any human-annotated semantic segmentation information accompanying the data. This can be implemented in one of two ways. For the first method and as depicted in FIG. 3, the system includes a semantic segmentation decoder 314 that operates on the latent space. An example of such a segmentation decoder 314 is the decoder component of the U-Net architecture for segmentation, as described in Literature Reference No. 8. For the second method and as depicted in FIG. 4, the system employs a second encoder 400-decoder 402 pipeline that operates on a semantic map 406 of the current frame to directly modulate the primary decoders (element 304 in FIG. 4). An example implementation is the SPADE (SPatially-Adaptive DEnormalization) technique introduced in Literature Reference No. 9 for incorporating the information from a semantic map into a neural image generator. This incorporation of information happens after each batch normalization of the feature maps within the decoder 402. When applying SPADE to a given (unbatched) feature map, the segmentation map is first scaled to the corresponding spatial size of the feature map. This scaled feature map is then passed to a single convolutional layer with a fixed number of channels and corresponding activation function. The output of this is then passed to two separate convolutional layers with the same number of channels as the given feature map. These outputs form the normalization and bias terms, which are of the same shape as the feature map. In order to obtain the final output from SPADE 408, the normalization and bias terms are elementwise multiplied and added to the feature map, respectively. In other words, the output of SPADE 408 is a feature map that incorporates the semantic segmentation information and gets added to the corresponding feature map in the first decoder 304. That is, SPADE 408 is providing the parameters for the modified layer-wise batch normalizations in the first decoder 304. These parameters are based on the output from the second decoder 402. As understood by those skilled in the art, details of the modified batch normalizations are given in equations (1), (2), and (3) of Literature Reference No. 9.

Incorporating the semantic map information in the video generative process provides the following benefits:
1. Native imposition of semantic constraints would facilitate the generated video to be semantically-temporally coherent. This could be useful, for example, when generating videos with specific semantic requirements.
2. For semantic maps, the distance between semantically distinct objects is maximal; thus, the boundaries and areas of the objects in the generated frames are expected to be consistent (solid objects can't split apart, boundaries deform smoothly, etc.).
3. The semantic map generation is a direct "modeling" of the objects themselves, thereby allowing for more semantically meaningful interactions between objects. For example, when the class "rock" is in "water" it will sink but when "plastic" is in "water" it will float.

As shown in the aspects depicted in both FIGS. 3 and 4, the system also includes a mechanism to extract semantic concepts 316 and consolidates the concepts 316 into the architecture. Any suitable mechanism for concept extraction can be utilized to extract the semantic concepts 316. Non-limiting examples of such mechanisms include those in both U.S. application Ser. No. 17/590,726, entitled, "System and Method for Improved Generalization From Concept Constrained Dreams" and U.S. application Ser. No. 17/901,703, entitled, "System and Method for Unsupervised Concept Extraction From Reinforcement Learning Agents", the entirety of which are incorporated herein by reference.

In operation, the system first determines portions of the input space that are relevant for the next time-step predictions of the world model 306 during training. Perturbation methods are used to provide a saliency score for each pixel of each frame within a dataset of inputs. Saliency values are then z-scored and filtered per-input such that values less than 2 standard deviations from the mean are set to 0. Connected components are extracted using the OpenCV library and components that contain less than 1% of the total pixels in the image are discarded. This yields a dataset of $N*M_t$ salient visual patches where N is total number of inputs and $M_t$ is the total number of connected components from the input at time t.

Each connected component (indexed by i) within each input is converted to a binary mask of the salient portion ($H_{i,t}$) that is multiplied with the original input $I_t$, and finally the mean pixel value is added across that image. Each image in this dataset ($l_{i,t}'$) has salient portions of the image undisturbed at their original spatial location situated on an uninformative background. This dataset of salient visual components is then input to the encoder 302 network to get the bottleneck's low-dimensional representation for each component. These encoded components, which now represent a point in the encoder's latent space, are then clustered into C clusters using the k-means algorithm. This clustering effectively segments the encoder's latent space according to the world model 306 for making temporal predictions. Another environment model or world model is then trained based on the latent space augmented by the cluster labels. Specifically, the input to the new world model is the concatenation of the latent representation of the current input, a one-hot encoding of the current action, and one minus the distance of the current encoded input to each cluster center.

To demonstrate the efficacy of the system, a pilot study was conducted to show the utility of GANs to improve the semantic grounding of generated videos. The test environment was point-to-point navigation implemented in the CARLA driving simulator using a custom-built interface to support the OpenAI Gym standards. The CARLA driving simulator is an open-source simulator for autonomous driving research found at carla.org and described in Literature Reference No. 13.

Each time-step in the environment provides a red-green-blue (RGB) camera image from the driver's perspective. Reward at each time step in this environment is a simplified estimate of safe and effective driving from some starting position to a target end position:

$$r_t = 1000(d_{t-1} - d_t) + 0.05(v_t - v_{t-1}) - 0.00002(c_t - c_{t-1}) - 2(s_t - s_{t-1}) - 2(o_t - o_{t-1})$$

Reward ($r_t$) for a given time point t is a weighted sum of five terms: distance traveled towards the goal $d_t$ in km, speed $v_t$ in km/h, collision damage $c_t$, intersection with the sidewalk $s_t$ (between 0 and 1), and intersection with the opposite lane $o_t$ (between 0 and 1). There are five start and end point defined driving routes during training, and the timeseries data extracted from an agent's interaction with the environment is saved as a list of [observations, actions, rewards] for each time step. This collection of time series data is referred to as a "rollout" of experience or an "episode". For a given instantiation in the environment with a specific start and end point pair, the agent is allowed to interact with the environment for 300 time steps or until it reaches the prescribed end point.

An initial dataset is first collected from the CARLA simulator using a randomly initialized deep reinforcement learning neural network for 130,000 environment interactions over the 5 unique episode starting points. These saved interactions, each comprised of a state, action, reward, and done (episode-end) tuple, yielding several hundred episodes each with a maximum length of 300 interactions. The reduced system for this pilot study consisted of a VAE whose bottleneck or latent space projected into the World Model and an Actor-Critic controller model with adversarial discriminators operating on the outputs of the decoder in the VAE at both frame and video levels. The collected dataset was used for offline training and validation of the VAE and the World Model in sequence.

VAE training was done using a network with a latent dimension size of 64 units. Training was done using a batch size of 32 samples for up to 500 epochs of the full 100,000 samples in the training set. Early stopping of training was used such that training stopped when the test error (evaluated on the last 30,000 samples collected, which were not used during training) showed no decrease in test loss greater than $10^4$ for 30 contiguous epochs. The trained VAE was then used as pre-processing on the states when feed into the world model. Each epoch of training in the world model was done using full episodes in batches of 20 over the whole 100,000 frames for up to 500 epochs. Early stopping was again triggered if the test error did not decrease by $10^4$ for 10 contiguous epochs. The Actor-Critic controller model was defined using a minimal architecture which consisted of a linear fully connected network with a hidden dimension of 512 units that split into two output heads: the 9 discrete actions for the actor head and the single value output for the critic head. This controller model was then optimized using the PPO algorithm in an online manner with live interactions with the real driving environment for 100,000 steps while using the VAE as a fixed image encoder.

Here the intent is to improve the semantic grounding and overall quality of the generated dreams allowing for improved human interpretability. The two adversarial discriminator networks were provided with both generated data and real data while being tasked with discriminating between the two. One discriminator was provided with single frames to try and improve the quality within a given frame and the other with a sequence of frames to improve the temporal coherence across frames. The VAE and world model losses were augmented to include the loss term from the corresponding discriminator allowing for GAN-based gradient updates to improve the video generation. The Fréchet Video Distance (FVD) metric as described in Literature Reference No. 12 was used to compare the GAN-augmented architecture to the basic setup without the GANs. The FVD metric measures how closely a given video matches a known distribution of target videos and has been shown to correlate with human judgements on video quality. In this case, a 25% reduction in FVD scores was found (1092 without GANs to 839 with GANs). In other words, inclusion of GANs improved the semantic grounding of generated videos by at least 25%.

Figure 5:
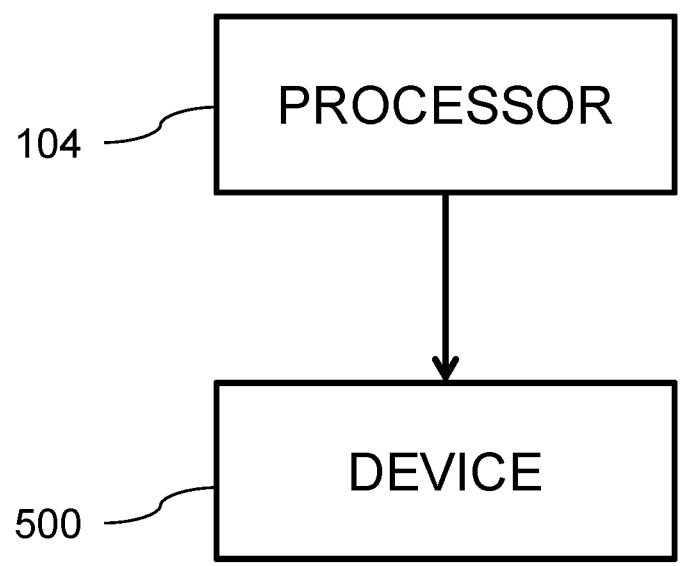
FIG. 5 is a block diagram depicting control of a device according to various embodiments.

As can be appreciated by those skilled in the art, the system as described herein can be incorporated into a variety of applications. In some embodiments and as shown in shown in FIG. 5, the system and associated processor(s) 104 may be used to control a device 500 (e.g., an autonomous vehicle, a mobile device display, a virtual reality display, an augmented reality display, a computer monitor, a motor, a machine, a drone, a camera, etc.) based on semantically grounded video generation. For example, if it was an image classifier and incorporated into an autonomous vehicle, and if the vehicle classified an object as a pedestrian in front of the pathway of the vehicle, the system could cause the vehicle to brake to avoid collision with the pedestrian. The trained system can be used in this way in order to prevent undesired events. In the case where the input to the system is the pedestrian walking into the street, the process can be run in real time to generate predictions for the future frames. If the result of the video generation is a collision of the vehicle with the pedestrian, the vehicle can take an emergency response action (e.g., heavily breaking). In the context of training robotic systems (e.g., an autonomous platform, such as a self-driving car, drone, etc.), the generated videos can be used as a method of data augmentation for settings where data isn't readily available (e.g., outlier/anomalous examples).

Finally, while this invention has been described in terms of several embodiments, one of ordinary skill in the art will readily recognize that the invention may have other applications in other environments. It should be noted that many embodiments and implementations are possible. Further, the following claims are in no way intended to limit the scope of the present invention to the specific embodiments described above. In addition, any recitation of "means for" is intended to evoke a means-plus-function reading of an element and a claim, whereas, any elements that do not specifically use the recitation "means for", are not intended to be read as means-plus-function elements, even if the claim otherwise includes the word "means". Further, while particular method steps have been recited in a particular order, the method steps may occur in any desired order and fall within the scope of the present invention.

What is claimed is:

1. A system for semantically grounded video generation, the system comprising:
   one or more processors and associated memory, the memory being a non-transitory computer-readable medium having executable instructions encoded thereon, such that upon execution of the instructions, the one or more processors perform operations of:
      receiving a raw video frame of a scene from one or more sensors on an autonomous platform;
      encoding the raw video frame into a low-dimensional representation of the scene;
      decoding the low-dimensional representation into a raw observation space;
      decoding the low-dimensional representation into a corresponding semantic segmentation map for the scene;
      feeding the low-dimensional representation into a controller model for the autonomous platform;
      extracting semantic concepts in the low-dimensional representation that are related to an action selection by the controller model;
      feeding the extracted semantic concepts into a world model to predict state and action dynamics of the autonomous platform;
      feeding the raw observation space into discriminator networks that operate on frames and videos to determine between real and synthetically generated content;
      modifying a generative capability of one or more encoders and decoders such that the discriminator networks are unable to distinguish between real and synthetically generated content; and
      recursively generating semantically grounded videos using a conjunction of the world model and controller model.

2. The system as set forth in claim 1, further comprising an operation of training one or more neural networks from real data, reward signals, and the generated semantically grounded videos.

3. The system as set forth in claim 1, wherein the discriminator network includes a frame discriminator and a video discriminator, the frame discriminator being operable for individual frames to subsequently facilitate generation of realistic frames, and wherein the video discriminator is operable for sequences of frames to subsequently facilitate generation of realistic videos.

4. The system as set forth in claim 1, wherein in recursively generating semantically grounded videos, the controller model generates a predicted action of the autonomous platform while the world model predicts a next state in a latent space of the generated semantically grounded video in response to the predicted action and current state.

5. The system as set forth in claim 1, further comprising operations of:
   encoding a semantic segmentation map of a current frame to generate feature maps;
   decoding the feature maps to generate a corresponding decoded semantic segmentation map for the scene; and
   transforming the decoded semantic segmentation map to modulate generation of a raw video frame using modified layer-wise batch normalizations.

6. The system as set forth in claim 1, wherein the one or more encoders and decoders are modified using adversarial training methods until the discriminator networks are unable to distinguish between real and synthetically generated content.

7. The system as set forth in claim 1, wherein the semantically grounded videos are recursively generated using a conjunction of the world model and controller model by triggering a random input in any of the one or more sensors or by a random initialization in the low-dimensional representation or by a random initialization in the extracted semantic concepts.

8. A computer program product for semantically grounded video generation, the computer program product comprising:
   a non-transitory computer-readable medium having executable instructions encoded thereon, such that upon execution of the instructions by one or more processors, the one or more processors perform operations of:
      receiving a raw video frame of a scene from one or more sensors on an autonomous platform;
      encoding the raw video frame into a low-dimensional representation of the scene;
      decoding the low-dimensional representation into a raw observation space;
      decoding the low-dimensional representation into a corresponding semantic segmentation map for the scene;
      feeding the low-dimensional representation into a controller model for the autonomous platform;
      extracting semantic concepts in the low-dimensional representation that are related to an action selection by the controller model;
      feeding the extracted semantic concepts into a world model to predict state and action dynamics of the autonomous platform;
      feeding the raw observation space into discriminator networks that operate on frames and videos to determine between real and synthetically generated content;
      modifying a generative capability of one or more encoders and decoders such that the discriminator networks are unable to distinguish between real and synthetically generated content; and
      recursively generating semantically grounded videos using a conjunction of the world model and controller model.

9. The computer program product as set forth in claim 8, further comprising an operation of training one or more neural networks from real data, reward signals, and the generated semantically grounded videos.

10. The computer program product as set forth in claim 8, wherein the discriminator network includes a frame discriminator and a video discriminator, the frame discriminator being operable for individual frames to subsequently facilitate generation of realistic frames, and wherein the video discriminator is operable for sequences of frames to subsequently facilitate generation of realistic videos.

11. The computer program product as set forth in claim 8, wherein in recursively generating semantically grounded videos, the controller model generates a predicted action of the autonomous platform while the world model predicts a next state in a latent space of the generated semantically grounded video in response to the predicted action and current state.

12. The computer program product as set forth in claim 8, further comprising operations of:
  encoding a semantic segmentation map of a current frame to generate feature maps;
  decoding the feature maps to generate a corresponding decoded semantic segmentation map for the scene; and
  transforming the decoded semantic segmentation map to modulate generation of a raw video frame using modified layer-wise batch normalizations.

13. The computer program product as set forth in claim 8, wherein the one or more encoders and decoders are modified using adversarial training methods until the discriminator networks are unable to distinguish between real and synthetically generated content.

14. The computer program product as set forth in claim 8, wherein the semantically grounded videos are recursively generated using a conjunction of the world model and controller model by triggering a random input in any of the one or more sensors or by a random initialization in the low-dimensional representation or by a random initialization in the extracted semantic concepts.

15. A computer implemented method for semantically grounded video generation, the method comprising an act of:
  causing one or more processors to execute instructions encoded on a non-transitory computer-readable medium, such that upon execution, the one or more processors perform operations of:
    receiving a raw video frame of a scene from one or more sensors on an autonomous platform;
    encoding the raw video frame into a low-dimensional representation of the scene;
    decoding the low-dimensional representation into a raw observation space;
    decoding the low-dimensional representation into a corresponding semantic segmentation map for the scene;
    feeding the low-dimensional representation into a controller model for the autonomous platform;
    extracting semantic concepts in the low-dimensional representation that are related to an action selection by the controller model;
    feeding the extracted semantic concepts into a world model to predict state and action dynamics of the autonomous platform;
    feeding the raw observation space into discriminator networks that operate on frames and videos to determine between real and synthetically generated content;
    modifying a generative capability of one or more encoders and decoders such that the discriminator networks are unable to distinguish between real and synthetically generated content; and
    recursively generating semantically grounded videos using a conjunction of the world model and controller model.

16. The method as set forth in claim 15, further comprising an operation of training one or more neural networks from real data, reward signals, and the generated semantically grounded videos.

17. The method as set forth in claim 15, wherein the discriminator network includes a frame discriminator and a video discriminator, the frame discriminator being operable for individual frames to subsequently facilitate generation of realistic frames, and wherein the video discriminator is operable for sequences of frames to subsequently facilitate generation of realistic videos.

18. The method as set forth in claim 15, wherein in recursively generating semantically grounded videos, the controller model generates a predicted action of the autonomous platform while the world model predicts a next state in a latent space of the generated semantically grounded video in response to the predicted action and current state.

19. The method as set forth in claim 15, further comprising operations of:
  encoding a semantic segmentation map of a current frame to generate feature maps;
  decoding the feature maps to generate a corresponding decoded semantic segmentation map for the scene; and
  transforming the decoded semantic segmentation map to modulate generation of a raw video frame using modified layer-wise batch normalizations.

20. The method as set forth in claim 15, wherein the one or more encoders and decoders are modified using adversarial training methods until the discriminator networks are unable to distinguish between real and synthetically generated content.

21. The method as set forth in claim 15, wherein the semantically grounded videos are recursively generated using a conjunction of the world model and controller model by triggering a random input in any of the one or more sensors or by a random initialization in the low-dimensional representation or by a random initialization in the extracted semantic concepts.

* * * * *